United States Patent
Brewer et al.

(10) Patent No.: US 8,960,137 B2
(45) Date of Patent: Feb. 24, 2015

(54) INTEGRATED EXHAUST CYLINDER HEAD

(75) Inventors: Todd Jay Brewer, Dearborn, MI (US); John Christopher Riegger, Ann Arbor, MI (US); Kevin V. Tallio, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 13/227,174

(22) Filed: Sep. 7, 2011

(65) Prior Publication Data

US 2013/0055971 A1    Mar. 7, 2013

(51) Int. Cl.
| | |
|---|---|
| *F01L 1/12* | (2006.01) |
| *F02F 1/24* | (2006.01) |
| *F02F 1/38* | (2006.01) |
| *F02F 1/40* | (2006.01) |
| *F02F 1/36* | (2006.01) |
| *F01N 3/04* | (2006.01) |
| *F01N 13/10* | (2010.01) |
| *F01P 3/02* | (2006.01) |
| *F01P 3/12* | (2006.01) |
| *F02B 3/06* | (2006.01) |
| *F02F 1/42* | (2006.01) |

(52) U.S. Cl.
CPC ... *F02F 1/24* (2013.01); *F02F 1/38* (2013.01); *F02F 1/40* (2013.01); *F02F 1/243* (2013.01); *F02F 1/36* (2013.01); *F01N 3/046* (2013.01); *F01N 13/105* (2013.01); *F01P 3/02* (2013.01); *F01P 3/12* (2013.01); *F02F 2001/245* (2013.01); *F02B 3/06* (2013.01); *F02F 1/4214* (2013.01); *F02F 2001/247* (2013.01); *F02F 1/242* (2013.01); *Y02T 10/20* (2013.01)
USPC ................................... 123/41.82 R

(58) Field of Classification Search
CPC ..... F02F 1/40; F02F 1/4214; F02F 2001/245; F02F 2001/247; F02B 3/06
USPC ..................................... 123/41.82 R
See application file for complete search history.

(56) References Cited

U.S. PATENT DOCUMENTS

| | | | |
|---|---|---|---|
| 4,346,676 A | * | 8/1982 | Tyner ........................ 123/41.74 |
| 4,800,720 A | * | 1/1989 | Okada ............................ 60/313 |
| 5,072,583 A | | 12/1991 | Urushihara et al. |
| 5,561,915 A | * | 10/1996 | Vandergriff ..................... 34/201 |
| 6,062,024 A | | 5/2000 | Zander et al. |
| 6,186,846 B1 | * | 2/2001 | Takayanagi ................. 440/89 R |
| 6,295,963 B1 | | 10/2001 | Kollock et al. |
| 6,685,515 B1 | * | 2/2004 | Satoh et al. ....................... 440/2 |
| 6,941,755 B2 | | 9/2005 | Bucknell et al. |
| 7,089,737 B2 | | 8/2006 | Claus |
| 7,784,442 B2 | | 8/2010 | Lester et al. |
| 2003/0056502 A1 | | 3/2003 | Katayama et al. |
| 2005/0008479 A1 | * | 1/2005 | Doring et al. ................. 415/151 |
| 2009/0241526 A1 | | 10/2009 | Son et al. |
| 2009/0277172 A1 | * | 11/2009 | Nordling ......................... 60/614 |
| 2010/0126153 A1 | | 5/2010 | Nagafuchi |

* cited by examiner

*Primary Examiner* — Lindsay Low
*Assistant Examiner* — Charles Brauch
(74) *Attorney, Agent, or Firm* — Julia Voutyras; Alleman Hall McCoy Russell & Tuttle LLP

(57) ABSTRACT

An engine cooling system is provided. The engine cooling system includes a cylinder head including an integrated exhaust manifold that directs exhaust gases to an exhaust outlet port and a coolant passage surrounding the exhaust manifold. The engine cooling system further includes a cluster of separated exhaust passages for directing exhaust gases to the exhaust outlet port, the cluster including a drill hole disposed within material between the exhaust passages, the drill hole fluidically coupled to the coolant passage.

17 Claims, 11 Drawing Sheets

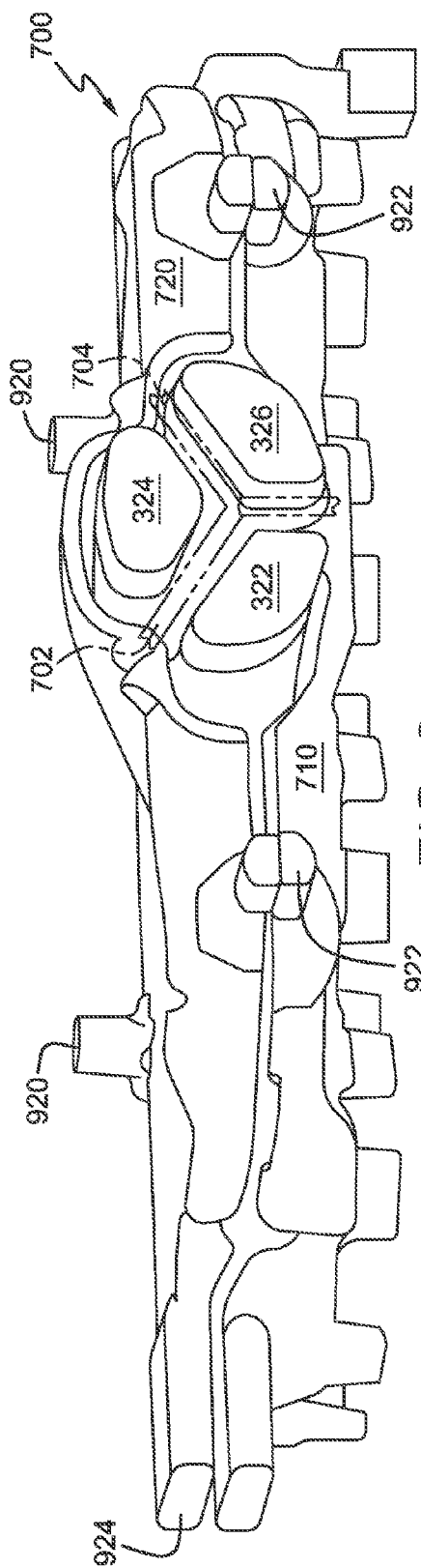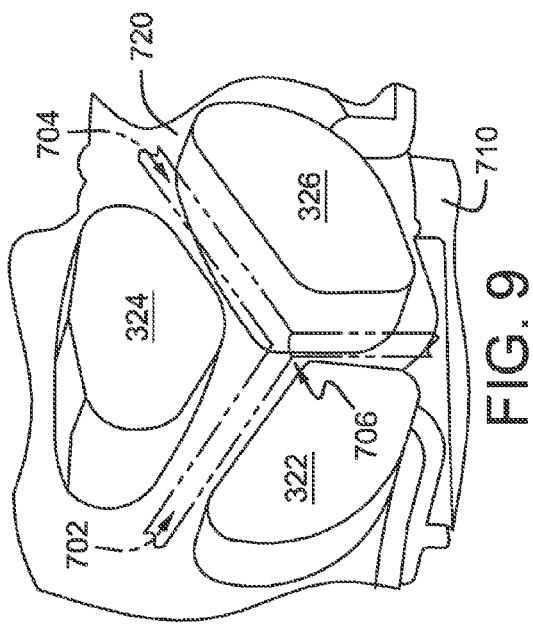

INTEGRATED EXHAUST CYLINDER HEAD

BACKGROUND AND SUMMARY

Exhaust manifolds for internal combustion engines may be exposed to high thermal loads. Exhaust manifolds that are integrated into cylinder heads (IEM cylinder heads) may experience particularly high thermal loading due to the heat transfer characteristics of the integrated design. For example, IEM cylinder heads may channel exhaust to a single exhaust outlet port, which experiences a high thermal load during operation of the vehicle.

Thermal loading of an integrated exhaust manifold and neighboring components can be reduced by incorporating coolant jackets into the cylinder head. The coolant jackets with a coolant core formed therein can reduce the thermal stresses on the cylinder head caused by heat generated during engine operation. For example, a cylinder head having an integrated exhaust manifold is disclosed in U.S. Pat. No. 7,367,294. Upper and lower coolant jackets encompass a major portion of the cylinder head to remove heat from the cylinder head via heat exchange with a circulated liquid coolant.

However, the inventors herein have recognized issues with the above described approach. In one example, exhaust gases may be insufficiently cooled. Under such conditions, the temperature of cylinder head will increase in a region of the cylinder head proximal to the exhaust passages, particularly in a region proximal to the single exhaust port. As a result, the cylinder head and/or other cylinder components may be thermally degraded too quickly. Further, downstream engine or vehicle components, such as a turbocharger and/or an emission control system, may be thermally degraded. In another example, sharing a single exhaust passage may increase flow or pressure pulsation communication between cylinders. During overlapping pulses of cylinders, one or more cylinders may receive high pressure exhaust blowdown from another cylinder, and thus engine efficiency may be reduced.

As such, various example systems and approaches to address the above issues are described herein. In one example, an engine cooling system comprises a cylinder head including an integrated exhaust manifold that directs exhaust gases to an exhaust port, a coolant passage surrounding the exhaust manifold, and a cluster of exhaust passages for directing exhaust gases to the exhaust port, the cluster of exhaust passages including at least one drill hole disposed within a material linking exhaust passages in the cluster of exhaust passages, the at least one drill hole fluidically coupled to the coolant passage. Further, the cluster of exhaust passages may comprise a first exhaust runner coupled to a first cylinder, a second merged exhaust runner coupled to a second cylinder and a third cylinder, and a third exhaust runner coupled to a fourth cylinder. Furthermore, the cylinder head may include a temperature sensor disposed in a top wall of the cylinder head above the exhaust port.

In this way, the cooling system may at least partially provide overheat protection to an engine, while reducing communication between cylinders. For example, coolant flow may be provided between the exhaust runners. As a result, a greater cooling surface area may be provided to the exhaust gas face for heat exchange with liquid coolant. Further, high pressure exhaust blowdown pulses may be separated and thus engine performance may be improved. Thus, a temperature of the exhaust gases and cylinder head components may be reduced. Furthermore, cooling of the exhaust gases may reduce thermal degradation of downstream components, such as a turbocharger and/or an emission control system. Further still, the temperature sensor may send a temperature signal to a controller of the vehicle, such that the controller may send an early over-temperature condition signal to an operator of the vehicle. Upon receiving the early over-temperature signal, the operator may stop the vehicle before thermal degradation occurs. Thus, performance and life of the engine, turbocharger, and emission control system can be improved when the cylinder head described above is utilized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows a schematic depiction of a cylinder head and associated cooling system that may be included in the internal combustion engine shown in FIG. 1.

FIG. 8 shows a perspective view of a coolant core and the cluster of exhaust passages of the integrated fuel cylinder head of FIG. 2.

FIG. 9 shows a front view of the coolant core and the cluster of exhaust passages showing coolant passages between exhaust passages within the cluster of exhaust passages.

FIGS. 2-12 are drawn approximately to scale.

DETAILED DESCRIPTION

A cylinder head with an integrated exhaust manifold (IEM cylinder head) is described herein. The IEM cylinder head includes a cluster of exhaust outlet passages and coolant passages in communication with a coolant inlet and a coolant outlet. The exhaust passage cluster may include one or more drill holes disposed within the material linking and separating each exhaust passage in the cluster of exhaust passages. The one or more drill holes may be in communication with the coolant passages. The coolant inlet and outlet may be in communication with a cylinder head cooling system. The cylinder head cooling system may be configured to flow coolant through the coolant passages in the cylinder head and the drill holes in the exhaust passage cluster, such that liquid coolant may be circulated through the walls of the exhaust passage cluster, proximal to the exhaust face. In this way, improved cooling may be provided to the cluster of exhaust passages. Moreover, cooling of exhaust gases may reduce over-temperature conditions of downstream components, such as a turbocharger and/or an emission control system. In this way, thermal stress and thermal degradation on the cluster of exhaust passages and components downstream of the integrated exhaust manifold may be reduced, thereby increasing the longevity of engine components.

Figure 1:
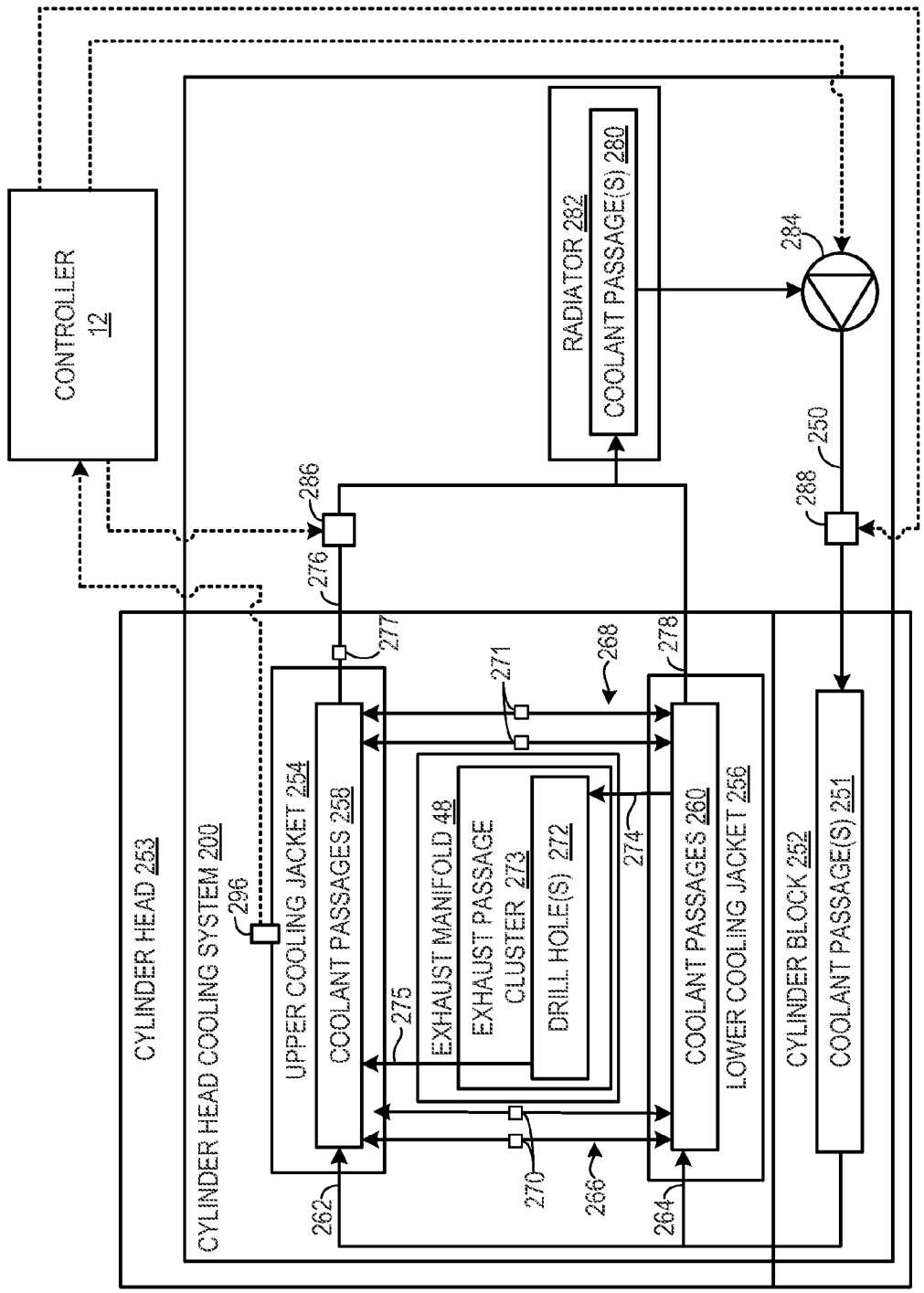
FIG. 1 shows a schematic depiction of an internal combustion engine.
Figure 2:
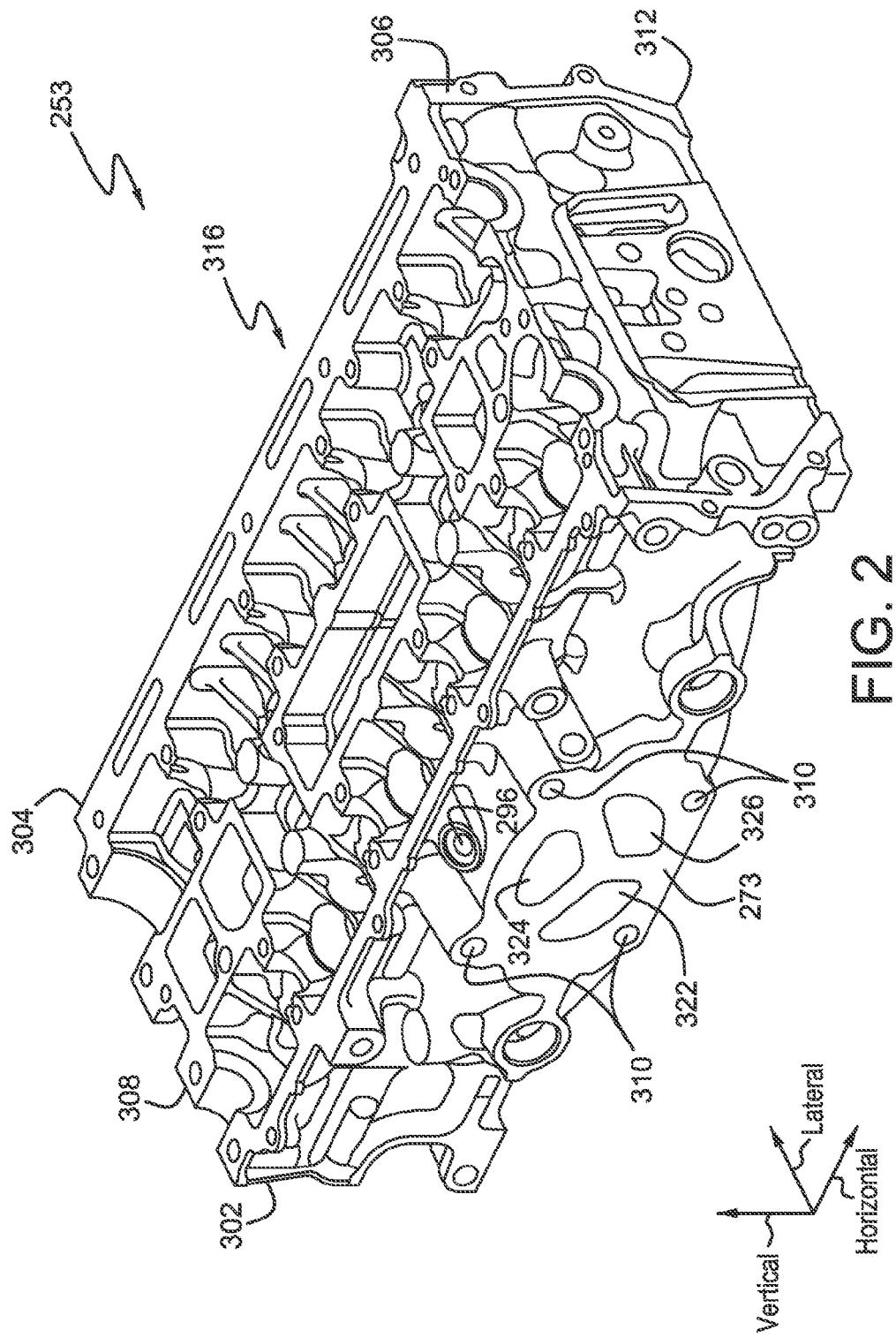
FIG. 2 shows perspective view of an exemplary integrated fuel cylinder head including a cluster of exhaust passages in an exhaust port.
Figure 3:
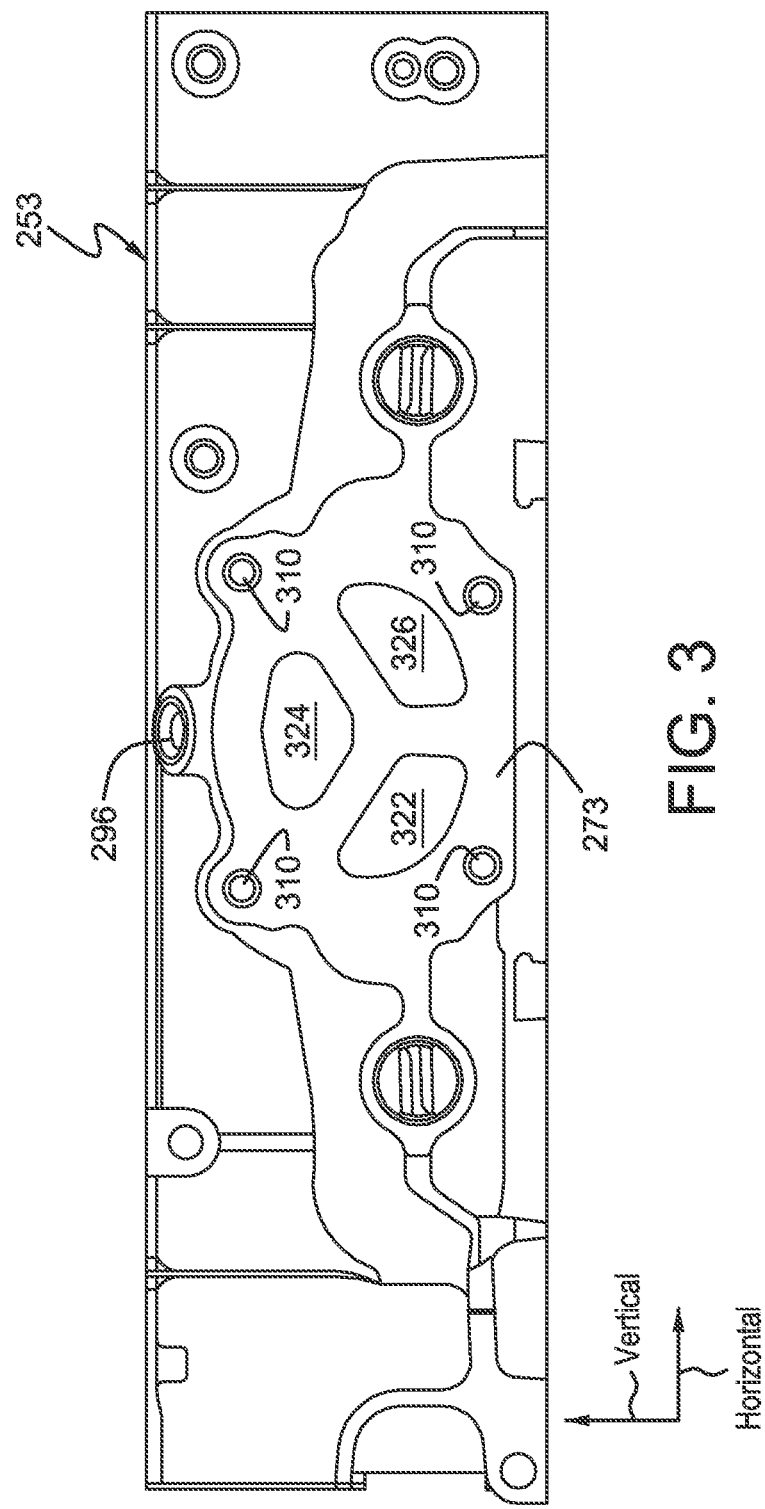
FIG. 3 shows a more detailed side view of the exhaust port of the cylinder head of FIG. 2
Figure 4:
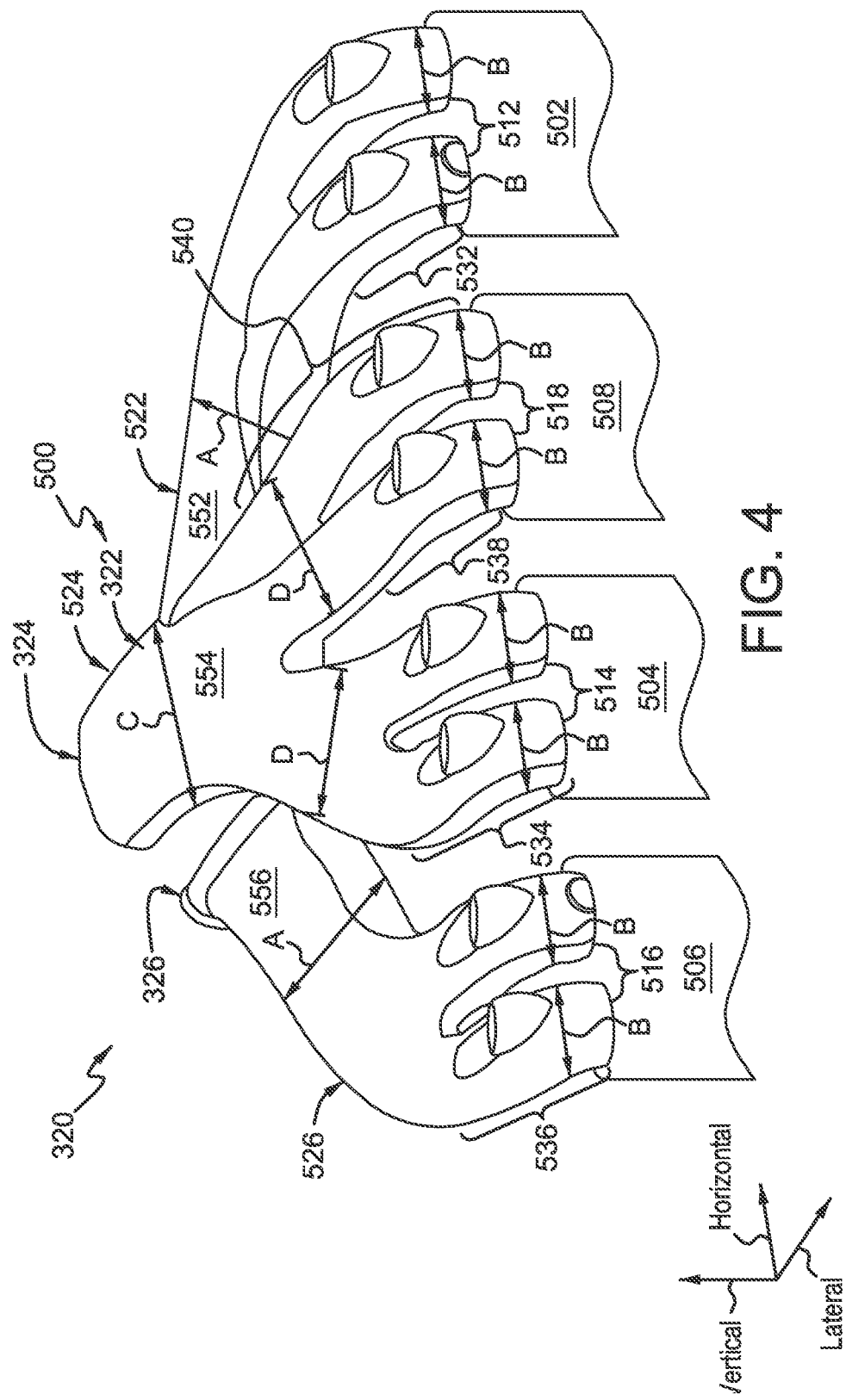
FIG. 4 shows the exhaust passage pathways of the exhaust passage cluster of FIGS. 2 and 3.
Figure 5:
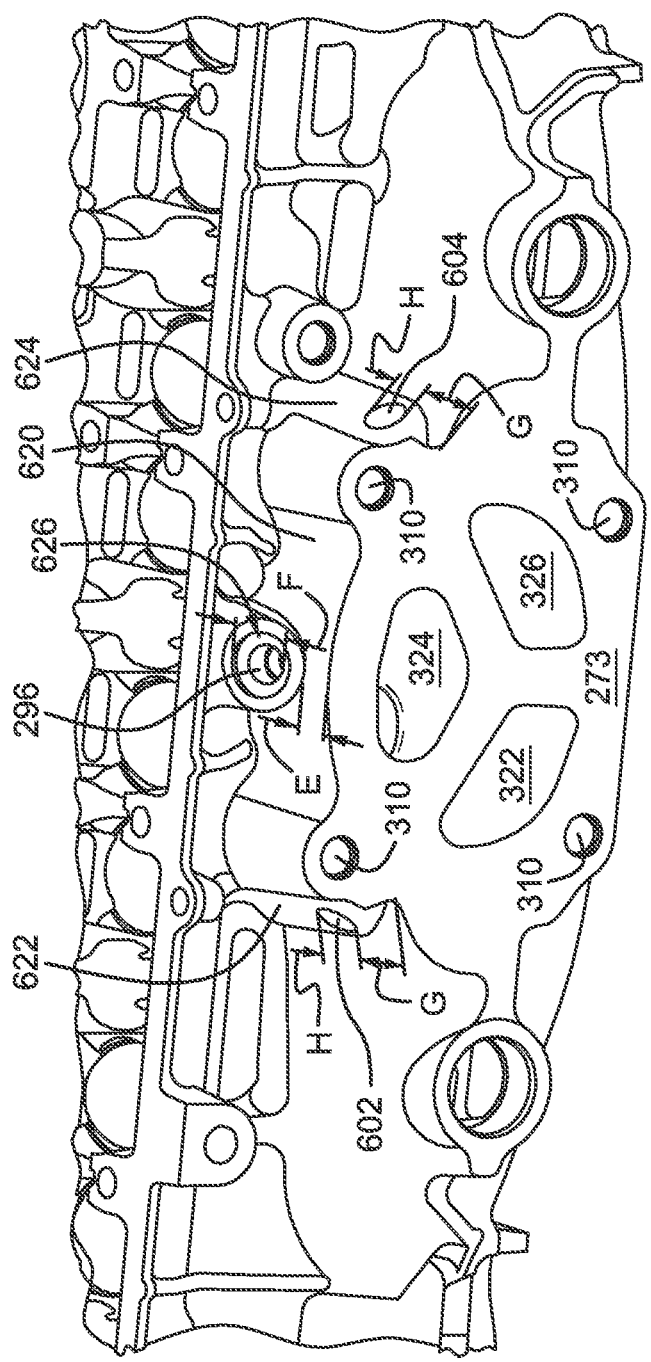
FIG. 5 shows a perspective view of the exhaust port of FIG. 3.
Figure 6:
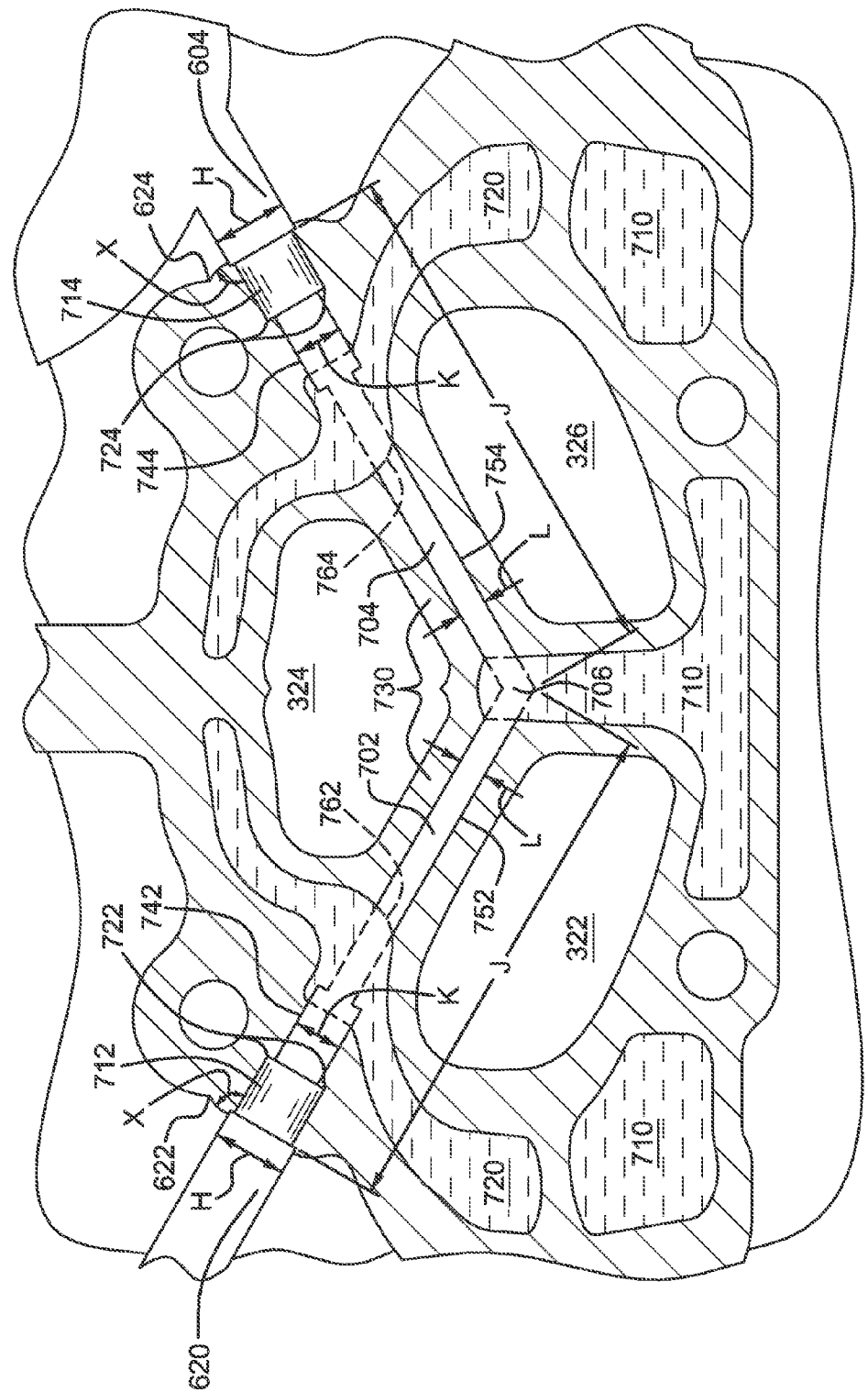
FIG. 6 shows a cross-sectional view of the cluster of exhaust passage along the 6-6' axis of FIG. 2.
Figure 7:
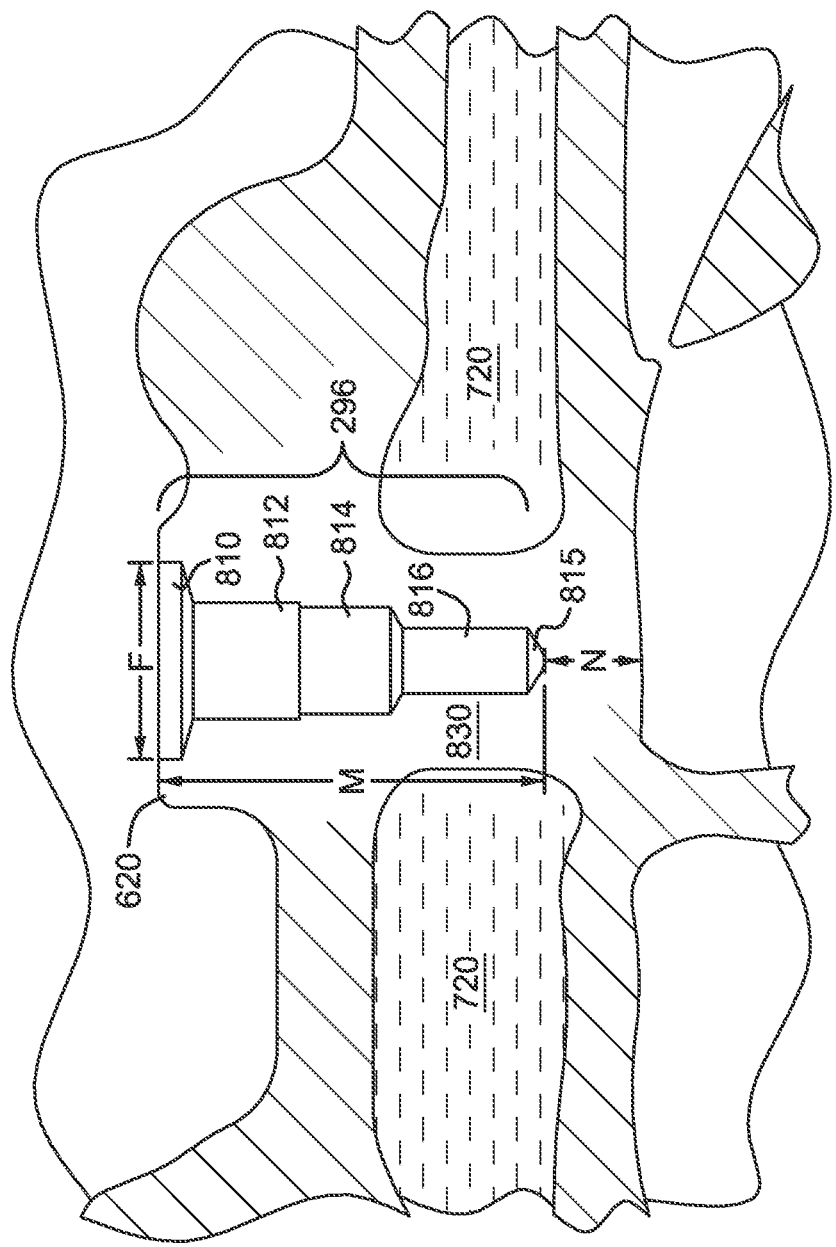
FIG. 7 shows a cross-sectional view of the temperature sensor along the 7-7' axis of FIG. 2.
Figure 10:
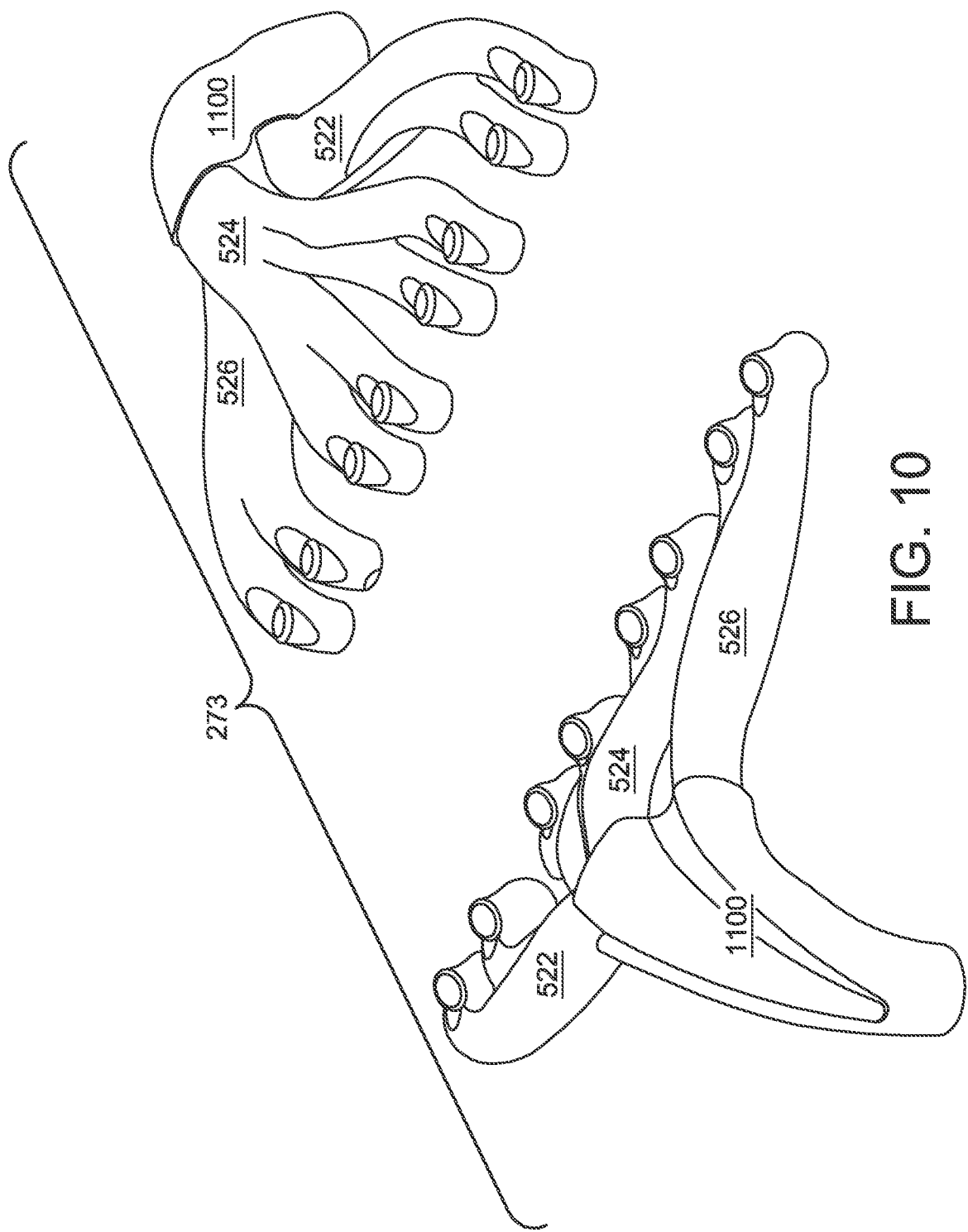
FIG. 10 shows two alternate perspective views of the exhaust passage cluster coupled to a mono scroll turbo neck at the exhaust port.
Figure 11:
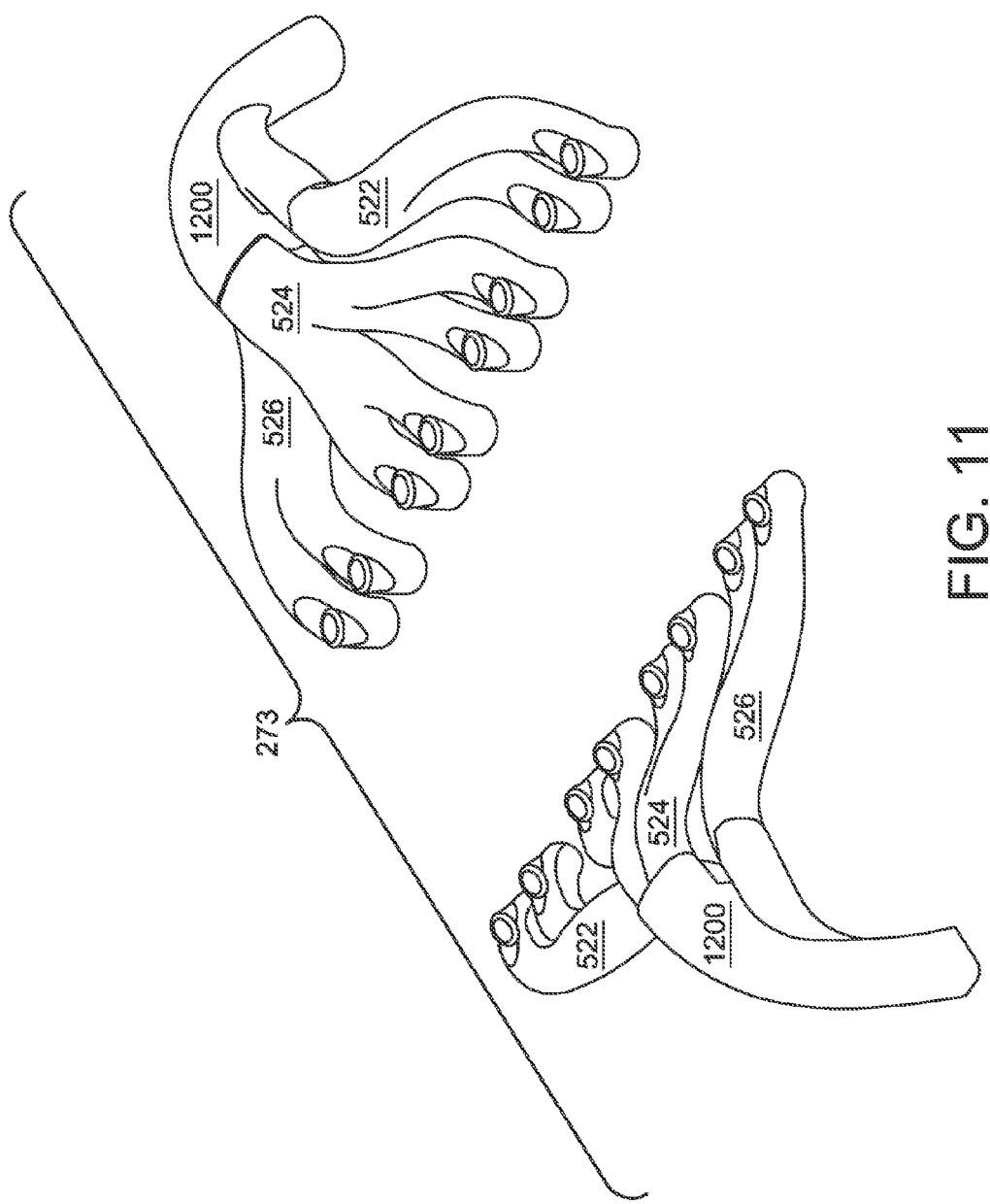
FIG. 11 shows two alternate perspective views of the exhaust passage cluster coupled to a bifurcated mono scroll turbo neck at the exhaust port.
Figure 12:
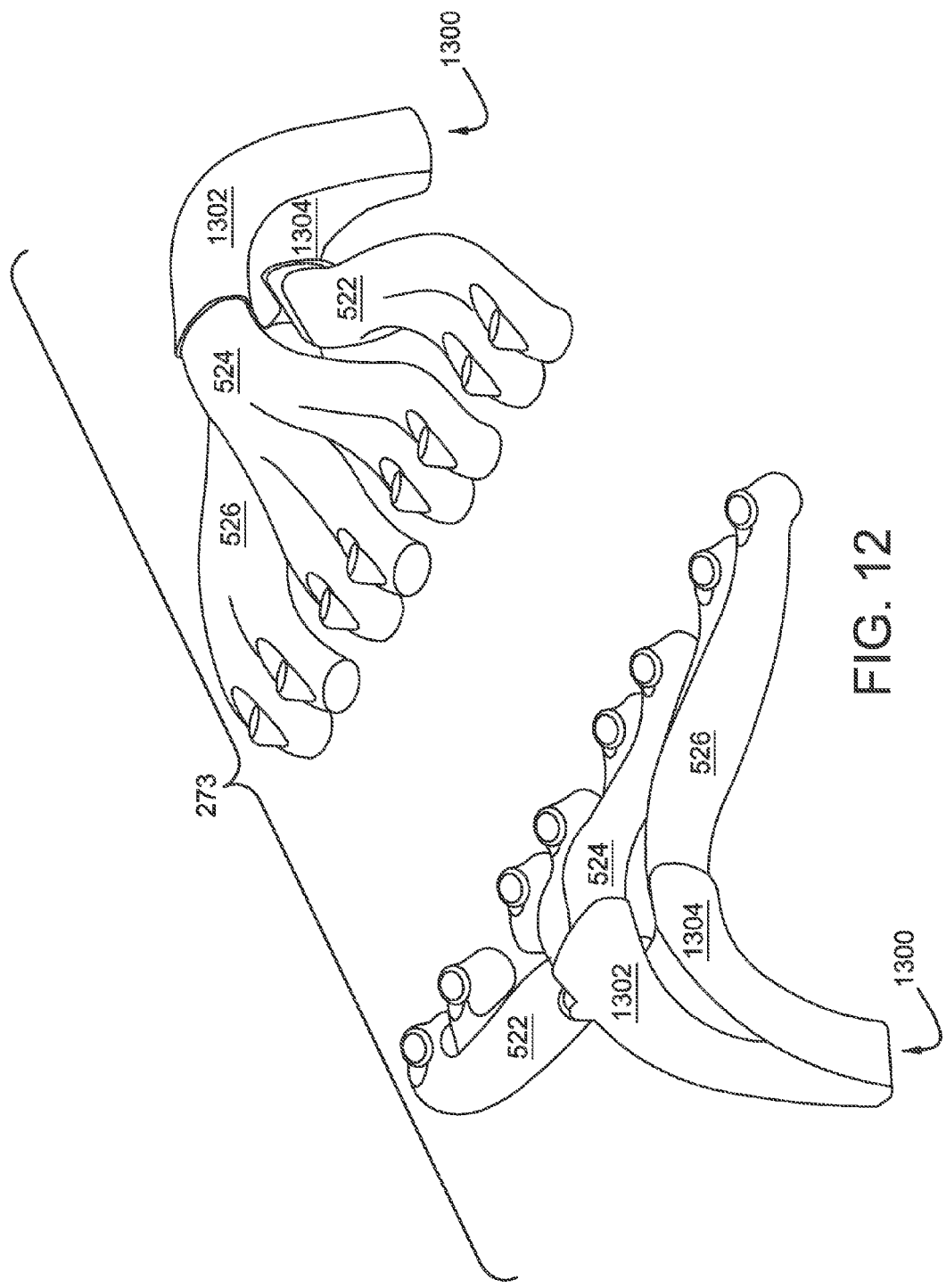
FIG. 12 shows two alternate perspective views of the exhaust passage cluster coupled to a twin scroll turbo neck at the exhaust port.

FIG. 1 includes schematic depictions of an example internal combustion engine and an example integrated cylinder head, respectively. As shown in FIG. 2, the integrated fuel cylinder head includes an exhaust port, which comprises a cluster of exhaust passages. FIG. 3 shows a more detailed view of the exhaust port of FIG. 2. FIG. 4 depicts the exhaust runners that define the plurality of exhaust passages, which are coupled to the exhaust port at a first end and are coupled to exhaust valves at a second, opposite end. FIG. 5 shows a perspective view of the of the exhaust port, depicting locations of drill hole openings and a temperature sensor. FIGS. 6 and 7 show cross sections of drill holes in the exhaust cluster passage and the temperature sensor, respectively. FIGS. 8 and 9 depict an upper coolant core and a lower coolant core sandwiching the exhaust passages. FIGS. 10-12 depict alternate embodiments for a turbo neck coupled to the exhaust port. FIGS. 2-12 depict components of the IEM cylinder head in an orientation in which they are positioned when the IEM cylinder head is mounted to an engine of a vehicle, when the vehicle is on a driving surface, such as a road. FIGS. 2-12 are drawn approximately to scale.

FIG. 1 shows a schematic depiction of a cylinder head cooling system 200 for an engine. The cooling system may be configured to remove heat from the engine. Controller 12 may be configured to regulate the amount of heat removed from the engine via coolant circuit 250. In this way, the temperature of the engine may be regulated allowing the combustion efficiency to be increased as well as reducing thermal stress on the engine.

Cooling system 200 includes coolant circuit 250 traveling through one or more cylinder block coolant passage(s) 251 in a cylinder block 252. Water or another suitable coolant may be used as the working fluid in the coolant circuit. The cylinder block may include a portion of one or more combustion chambers. It will be appreciated that the coolant circuit may travel adjacent to the portions of the combustion chambers. In this way, excess heat generated during engine operation may be transferred to the coolant circuit. A cylinder head 253 may be coupled to the cylinder block to form a cylinder assembly. When assembled, the cylinder assembly may include a plurality of combustion chambers.

The cylinder head cooling system further includes an upper cooling jacket 254 and a lower cooling jacket 256. The exhaust manifold 48 is disposed between the upper cooling jacket 254 and the lower cooling jacket 256. It will be appreciated that the upper and lower cooling jackets are integrated into the cylinder head. The upper cooling jacket includes a plurality of coolant passages 258. Likewise, the lower cooling jacket includes a plurality of coolant passages 260. As shown, the upper cooling jacket includes a coolant inlet 262 and the lower cooling jacket includes a coolant inlet 264. However, it will be appreciated that the upper and/or lower cooling jackets may include a plurality of inlets in other embodiments. For example, the upper cooling jacket may include a single inlet and the lower cooling jacket may include a plurality of inlets. It will be appreciated that the inlets of the upper and lower cooling jackets may be coupled to a common coolant passages in the cylinder block in some embodiments. In this way, the upper and lower cooling jackets receive coolant via their respective inlets from a common source included in an engine block of an engine. However, in other embodiments the inlets of the upper and lower cooling jackets may be coupled to separate coolant passages in the cylinder block.

A first set of crossover coolant passages 266 may fluidly couple the upper cooling jacket 254 to the lower cooling jacket 256. Similarly, a second set of crossover coolant passages 268 may fluidly couple the upper cooling jacket to the lower cooling jacket. Each crossover coolant passage included in the first set of crossover coolant passages may include a restriction 270. Likewise, each crossover coolant passage included in the second set of crossover coolant passages may include a restriction 271. Various characteristics (e.g., size, shape, etc.) of the restrictions may be tuned during construction of cylinder head 253. Therefore, the restrictions 270 included in the first set of crossover coolant passages may be different in size, shape, etc., than the restrictions 271 included in the second set of crossover coolant passages. In this way, the cylinder head may be tuned for a variety of engines, thereby increasing the cylinder head's applicability. Although two crossover coolant passages are depicted in both the first and second sets of crossover coolant passages, the number of crossover coolant passages included in the first set and second sets of crossover coolant passages may be altered in other embodiments.

The crossover coolant passages allow coolant to travel between the cooling jackets at various points between the inlets and the outlets of both the upper and lower cooling jackets. In this way, the coolant may travel in a complex flow pattern where coolant moves between the upper and lower jackets, in the middle of the jacket and at various other locations within the jacket. The mixed flow pattern reduces the temperature variability within the cylinder head during engine operation as well as increases the amount of heat energy that may be removed from the cylinder head, thereby improving engine performance.

The upper cooling jacket includes an outlet 276. Outlet 276 may include a restriction 277. Additionally, the lower cooling jacket includes an outlet 278. It will be appreciated that in other embodiments outlet 278 may also include a restriction. The outlets from both the upper and lower cooling jackets may combine and be in fluidic communication. The coolant circuit may then travel through one or more radiator coolant passage(s) 280 included in a radiator 282. The radiator enables heat to be transferred from the coolant circuit to the surrounding air. In this way, heat may be removed from the coolant circuit.

A coolant pump 284 may also be included in the coolant circuit. A thermostat 286 may be positioned at the outlet 276 of the upper cooling jacket. A thermostat 288 may also be positioned at the inlet of the one or more coolant passage(s) 251 of the cylinder block 252. Additional thermostats may be positioned at other locations within the coolant circuit in other embodiments, such as at the inlet or outlet of the one or more coolant passage(s) in the radiator, the inlet or outlet of the lower cooling jacket, the inlet of the upper cooling jacket, etc. The thermostats may be used to regulate the amount of fluid flowing through the coolant circuit based on the temperature. In some examples, the thermostats may be controlled via controller 12. However in other examples, the thermostats may be passively operated. Further, upper coolant jacket 254 includes a temperature sensor 296 in communication with controller 12.

It will be appreciated that controller 12 may regulate the amount of head pressure provided by coolant pump 284 to adjust the flow-rate of the coolant through the circuit and therefore the amount of heat removed from the engine. Furthermore, in some examples controller 12 may be configured to dynamically adjust the amount of coolant flow through the upper cooling jacket via thermostat 286. Specifically, the flow-rate of the coolant through the upper cooling jacket may be decreased when the engine temperature is below a threshold value. In this way, the duration of engine warm-up during a cold start may be decreased, thereby increasing combustion efficiency and decreasing emissions. It will be appreciated that the systems and components in FIG. 1 are schematically depicted and not meant to depict the relative location of the components.

Cooling of the exhaust manifold and engine exhaust via the coolant circuit and coolant jackets may protect the exhaust manifold and downstream engine components from thermal degradation, such as warping due to temperature gradients and/or degradation due to over-temperature conditions. In one particular example, liquid coolant is circulated via the coolant pump. In this way, coolant may be circulated around the exhaust manifold, enabling heat to be removed from the exhaust manifold. Therefore, thermal stresses on the cylinder head exhaust manifold, as well as neighboring components, may be reduced, thereby increasing component longevity. The radiator enables heat to be transferred from the coolant circuit to the surrounding air. In this way, heat may be removed from the coolant circuit.

However, problems may arise in the cooling system. In one example, if the engine temperature is high, the cooling system may provide insufficient cooling to exhaust gases and cylinder head components. In this example, coolant jacket walls may not have a large enough surface area to provide sufficient heat exchange between the exhaust gas and the coolant via the walls of the coolant jackets. As heated engine exhaust converges as it exits the IEM cylinder head, the material surrounding the exhaust gas passages may be subjected to high heat during selected operating conditions of the vehicle. As described above, under normal operating conditions, heat exchange with the liquid coolant through the upper coolant jacket wall relieves the high temperatures and prevents damage to engine components. If engine temperature is high, high temperatures of exhaust gases may occur due to insufficient heat transfer, and thus thermal degradation may occur.

In order to at least partially reduce such degradation, the cooling system 200 may be coupled to at least one drill hole 272 included in an exhaust passage cluster 273. The exhaust passage cluster may comprise a plurality of linked but separate exhaust passages, each of the exhaust passages coupled to at least one cylinder exhaust valve at a first end and an exhaust exit port at a second, opposing end. The at least one drill hole 272 includes a coolant inlet 274 and a coolant outlet 275. The exhaust passage cluster and the at least one drill hole are discussed further with reference to FIG. 4. The coolant inlet may be coupled to a higher pressure coolant passage in the cylinder head cooling system and the coolant outlet may be coupled to a lower pressure coolant passage in the cylinder head coolant system. It will be appreciated that the higher pressure coolant passage may be included in the upper or lower cooling jacket. Likewise, the lower pressure coolant passage may be included in the upper or lower cooling jacket. In one particular example, the higher pressure coolant passage is included in the lower cooling jacket and the lower pressure coolant passage is included in the upper cooling jacket.

In this way, coolant may be circulated within through the at least one drill hole, enabling heat to be removed from the exhaust passage cluster using an existing cooling system in the vehicle. Therefore, it will be appreciated that the manufacturing cost may be reduced when compared to other systems which may use independent cooling system to provide cooling to an exhaust system. Moreover, thermal stresses on the cylinder head exhaust passage cluster as well as neighboring components may be reduced, thereby increasing the engine components longevity. The exhaust passage cluster and the exhaust manifold coolant passage are discussed in greater detail herein with regard to FIGS. 2-6, 8, and 9. It will be appreciated that the systems and components in FIG. 1 are schematically depicted and not meant to depict the relative location of the components.

FIG. 2 shows a perspective view of an example IEM cylinder head 253. As stated above, the IEM cylinder head 253 is shown in an orientation in which the cylinder head is mounted to an engine in a vehicle, when the vehicle is on a driving surface, such as a road. The IEM cylinder head may be configured to attach to a cylinder block (not shown) which defines one or more combustion chambers having a piston reciprocally moving therein. The IEM cylinder head may be cast out of a suitable material such as aluminum. Other components of an assembled cylinder head have been omitted. The omitted components include a camshafts, camshaft covers, intake and exhaust valves, spark plugs, etc.

As shown, IEM cylinder head 253 includes four perimeter walls. The walls include a first and a second side wall, 302 and 304 respectively. The four perimeter walls may further include a front end wall 306 and a rear end wall 308. A bottom wall 312 may be configured to couple to the cylinder head (not shown) thereby forming the engine combustion chambers, as previously discussed. A top wall 316 is on an opposite side relative to the bottom wall 312.

IEM cylinder head 253 includes exhaust port 320 to which a plurality of exhaust runners (shown in FIG. 4) are coupled. The exhaust runners may be coupled to the exhaust valves of each combustion chamber (schematically shown in FIG. 4). In this way, the exhaust manifold and exhaust runners may be integrated into the cylinder head casting. The integrated exhaust runners have a number of benefits, such as reducing the number of parts within the engine thereby reducing cost throughout the engine's development cycle. Furthermore, inventory and assembly cost may also be reduced when an integrated exhaust manifold is utilized.

The cylinder head further includes exhaust manifold flange 273 surrounding the exhaust port 320. A temperature sensor 296 is located above the exhaust port 320 in the top wall 316. As depicted in FIGS. 2 and 3, the flange 273 comprises three openings to accommodate a first exhaust passage 322, a second exhaust passage 324, and a third exhaust passage 326 of the exhaust port 320. The flange further includes bolt bosses 310 or other suitable attachment apparatuses configured to attach to a downstream exhaust component, such as an exhaust conduit or an inlet of a turbine included in a turbocharger. In this way, the turbocharger (not shown) may be mounted directly to the cylinder head reducing losses within the engine. The turbocharger may include an exhaust driven turbine coupled to a compressor via a drive shaft. The compressor may be configured to increase the pressure in the intake manifold.

Also depicted in FIGS. 2 and 3, a temperature sensor 296 is located proximal to the degas port 290. The temperature sensor extends through a hole 410 in the upper coolant jacket above the exhaust port 320. Thus, the temperature sensor may measure a temperature in a "hot zone" of the integrated cylinder head. As depicted in FIG. 1, the temperature sensor 296 sends a temperature signal the controller 12. The controller may use this temperature data to infer operating conditions and/or performance of the cooling system, such as loss of coolant, inoperable pump, and/or a system blockage. The controller may then send a signal to the driver giving early indication of the presence of a cooling system degradation if the temperature is greater than a threshold. Alternatively, or additionally, the controller may adjust engine operation, such as fuel injection amount or spark timing, to reduce exhaust gas temperature.

As shown in FIG. 4, each of the exhaust passages 322, 324, and 326 is defined by an exhaust runner 522, 524, and 526, respectively. Exhaust runners 522, 524, and 526 for a cluster of exhaust passages 500. Each of the passages in the exhaust passage cluster 273 is further coupled to at least one cylinder exhaust valve. In the present embodiment, the exhaust runner 522 is coupled to a first cylinder, the exhaust runner 524 is coupled to a second cylinder and a third cylinder, and exhaust runner 526 is coupled to a fourth cylinder. Thus, the cylinders may be protected from high pressure exhaust blowdown pulses of other cylinders, thereby improving engine performance. In an alternate embodiment, each of the four cylinders may have a separate exhaust runner, thus the exhaust passage cluster may include four exhaust passages.

In the embodiment of FIG. 4, exhaust runner 522 includes a horizontally extended portion 552 having a width A, and exhaust runner 524 includes a horizontally extended portion 556 having a width A, which extends in an opposite direction to horizontally extended portion 552. Each of the horizontally extended portions 552 and 556 are curved inward toward a center of the cylinder head. Exhaust runner 524 includes a vertically extended portion 554 having a width C. The vertically extended portion is curved downward from a top of the exhaust port 320. In the present embodiment the width A is less than the width C. In one specific example, this width A is 37.2 mm and the width C is 53.4 mm. In an alternate embodiment, horizontally extended portions 552 and 556 may have differing widths. In another alternate embodiment, the width C may be equal to the width B.

The exhaust runner 522 is coupled to a pair of exhaust valves 512 of a first cylinder 502. The exhaust runner 526 is coupled to a pair of exhaust valves 516 of a fourth cylinder 506. Each of the exhaust runners 522 and 526 includes a split portion 532 and 536, respectively, where the extended portions of the exhaust runners are split into two smaller channels. Each of the channels of the split portions 532 and 536 have a width B and are coupled to one of the exhaust outlets of the pairs of exhaust outlets 532 and 536, respectively. In the present embodiment the width B is less than the width A. In one specific example, the width B is 25.8 mm.

Further, as shown in FIG. 4, exhaust runner 524 is coupled to a pair of exhaust valves 518 of a second cylinder 508 to and a pair of exhaust valves 514 of a third cylinder 504. To provide coupling to pairs of exhaust valves of two different cylinders, exhaust runner 524 includes a primary split portion 540 and secondary split portions 538 and 534. At primary split portion 540, the vertically extended portion 554 is split into two mid-sized channels having a width D. Each of the mid-sized channels is further split into two smaller channels having the width B in the secondary split portions 538 and 534. In the present embodiment the width D is less than the width C, and the width B is less than the width D. Further still, in the present embodiment the width D is greater than the width A.

In one specific example, the width D is 46.0 mm. In alternate embodiments, the widths C and D may be equal or the width D may be greater than the width C.

The above described configuration for an IEM cylinder head merges the exhaust ports from the second and third cylinders before they exit the cylinder head, while maintaining separate outlets for the first and fourth cylinders. This configuration may allow for increased cooling of exhaust gases and may provide separation of the high pressure exhaust blowdown pulses to reduce cylinder-to-cylinder communication of exhaust gases. Four cylinder engines, such as inline four cylinder engines, having each exhaust runner fluidly coupled within the IEM (i.e., merging into a single passage) may have architectural layouts and firing orders that allow the exhaust gas from one cylinder to induce cross talk between exhaust gas blowdown pulses. For example, adjacent cylinders such as the first and second cylinders may be fired in succession. Thus, the exhaust gas pulse from one cylinder will blow into another cylinder that is in the valve overlap portion of the cycle, allowing unwanted, uncontrolled hot exhaust gas to enter and get trapped in the cylinder. Further, in inline four cylinder engines the firing orders needed for engine balance, mitigates efforts to decrease this exhaust gas blowdown pulse cross talk. Decreasing cross talk may be needed in boosted engine due to the increased exhaust system pressures and higher engine output requirements. Consequently, when a firing order of 1342 is used in a 4 cylinder engine a paring of the 1-4 cylinder exhaust ports and/or 2-3 cylinder exhaust ports may be used. In other words, the exhaust gas from the $1^{st}$ and $4^{th}$ cylinder may be flowed together in the exhaust manifold and the exhaust gas from the $2^{nd}$ and $3^{rd}$ cylinder may be flowed together in the exhaust manifold. In this configuration, the cylinders with the connected exhaust ports may fire 360 crank angle degrees apart. In some embodiments an engine in which the IEM is positioned, may include a camshaft (e.g., intake camshaft, exhaust camshaft) having lobes configured to actuate valves corresponding to different cylinders. Consecutive lobes corresponding to a set of valve (e.g., intake or exhaust valves) may be spaced 90 degrees apart. Therefore, when the firing order 1342 is used, the lobes associated with the $1^{st}$ cylinder and the third cylinder may be spaced 90 degrees apart, the lobes associated with the $3^{rd}$ cylinder and $4^{th}$ cylinder may be spaced 90 degrees apart, etc. However, alternate lobe spacing may be used in other embodiments. It will be appreciated that the cylinders are numbered in consecutive order. Thus, cylinder 502 is the $1^{st}$ cylinder, cylinder 508 is the $2^{nd}$ cylinder, cylinder 504 is the $3^{rd}$ cylinder, and cylinder 506 is the $4^{th}$ cylinder, cylinders 502, 508, 504, and 506 are shown in FIG. 5. This allows time for the exhaust pulses to clear the exhaust system before the next cylinder enters the valve overlap period. Further, in another alternate embodiment a firing order of 1243 may need the same paring of cylinders.

In the present embodiment, in which the firing order is also 1-3-4-2, the merged exhaust runner, which is coupled to the second cylinder and the third cylinder, is configured to be symmetrically located above the other exhaust runners along a vertical centerline of the exhaust port. In an alternate embodiment, the merged exhaust runner may be below the other exhaust runners and/or the exhaust runners may be arranged asymmetrically. Further, in another alternate embodiment in an engine with an alternate number of cylinders, the connectivity and arrangement of the exhaust runners may depend on the number of cylinders and the firing order of the engine. In such an embodiment, exhaust runners may be paired to provide increased separation of exhaust pulses, based on crank angle. In some embodiments exhaust runners paired for fluidic coupling in the IEM may be configured such that the exhaust blowdown pulse of one paired cylinder does not occur during the overlap period of the other paired cylinder.

FIG. 5 includes a perspective view of the exhaust port 320. A top wall 620 of the exhaust port 320 includes the temperature sensor 296 at a top most portion 626. The temperature sensor 296 is located a distance E inward toward a center of the IEM cylinder head from flange 273. Further, a diameter of the temperature sensor 296 has a distance F. In the present embodiment, the distance F is greater than the distance E correct. In one specific example the distance E is 10.3 mm and the distance F is 16.6 mm.

The top wall 620 further includes angled portions 622 and 624 on opposing sides of the exhaust port 320. Angled portion 622 and 624 are aligned with each other in a longitudinal direction of the cylinder head 253. Angled portions 622 and 624 include drill hole openings 602 and 604, respectively. It will be appreciated that in alternate embodiments the cylinder head may include more or fewer drill holes. Drill hole openings 602 and 604 are located a distance G inward toward a center of the IEM from flange 273. Further, drill hole openings 602 and 604 each have a diameter with a distance H. In the present embodiment, the distance G is less than the distances E and H. In one specific example, the distance G is 4.8 mm and the distance H is 6.0 mm. In an alternate embodiment, the distance E may be greater than the distance G, such that the drill holes are located closer to the flange than the temperature sensor.

FIG. 6 shows a cross section of the exhaust passage cluster 273 along the 6-6' axis of FIG. 2. The cross-sectional view shows a coolant core 700 encompassing the exhaust passage cluster 273. The coolant core 700 comprises an upper coolant core 720 having multiple coolant passages and a lower coolant core 710 having multiple coolant passages. The upper coolant core 720 is enclosed by the upper coolant jacket 254, and the lower coolant core 710 is enclosed by the lower coolant jacket 256. Drill hole openings 602 and 604 are openings for drill holes 702 and 704, respectively. Drill holes 702 and 704 are angled inward and downward toward a center of the exhaust port 320. The drill holes are angled at an angle X relative to a top of the side walls 622 and 624. In one specific example, the angle X is 90 degrees.

Drill holes 702 and 704 each have a length J and project towards each other through the passages of the upper coolant core 710 and the material 730 linking the exhaust passage cluster 500. As the drill holes pass through the upper coolant core, they are in fluid communication with the upper coolant core. Further, drill holes 702 and 704 intersect at an intersection region 706. The drill holes intersect at an angle Y relative to each other. In one specific example, the angle Y is 120 degrees. The intersection region 706 is disposed within a passage of the lower coolant core 710, and is thus in fluid communication with the lower coolant core.

Drill holes 702 and 704 include consecutively smaller portions, having the width H at the openings 602 and 604, the width K at middle portions 742 and 744, and the width L at end portions 752 and 754, respectively. In the present embodiment, width H is greater than width K, and width K is greater than width L. In one specific example, the width K is 7.5 mm and the width L is 5.0 mm. Top openings 762 and 764 of middle portions 742 and 744, respectively, are open to passages of the upper coolant core 720.

Drill hole openings 602 and 604 are blocked by pipe plugs 712 and 714, respectively, such as ball plugs, rivet plugs, and/or screw plugs. The pipe plugs may be comprised of a compressible material such as aluminum, stainless steel, or steel. A width of each of the pipe plugs may be slightly larger than the width H, such as 6.1 mm. Bottom edges of the pipe plugs 712 and 714 are abutted against shoulders 722 and 724, respectively. Shoulders 722 and 724 are formed where the drill hole openings 602 and 604 meet middle portions such that the pipe plugs are compressed to form an air tight seal at the drill hole openings.

In the example configuration of FIG. 6, drill holes may be drilled through the cylinder head post production. Then, pipe plugs may be added to seal the openings of the drill holes. During operation of a vehicle, liquid coolant may be circulated from the lower coolant core passages to the upper coolant core passages through the drill holes. As such, a temperature of the material linking the exhaust passage cluster may be reduced via heat exchange with the liquid coolant. Further, a temperature of the exhaust gases traveling through the exhaust passages may be reduced via heat exchange with the material linking the exhaust passage cluster. Because the drill holes are air tightly sealed by the pipe plugs, liquid coolant may not escape through the drill hole openings. Thus, the above described cooling system may provides circulation of liquid coolant through the lower coolant core, the drill holes, and the upper cooling core, thereby cooling the exhaust gases passing through the cluster of exhaust passages, and may decrease the likelihood of thermal degradation of the cylinder head and downstream components.

FIG. 7 shows a cross section of the IEM cylinder head 253 along the 7-7' axis of FIG. 2. FIG. 7 includes a more detailed view of the temperature sensor 296 and its surrounding components. In the present embodiment, the temperature sensor includes consecutively narrower portions 810, 812, 814, and 816. Portion 810 is a top, largest portion of the temperature sensor and is confluent with surface of the top wall 620. The temperature sensor machined hole is narrower at the tip of the sensor to reduce the impact of coolant contact and flow reduction caused by the size of the metal boss for mounting the sensor.

The temperature sensor 296 is disposed within a vertical wall 830 of the cylinder head 253. Vertical wall 830 extends between passages of the upper core 720, and thus the temperature sensor 296 is encompassed by the upper core 720. For example, the temperature sensor is encompassed by the upper core because sides of the vertical wall wherein the temperature sensor is disposed are in contact with liquid coolant within the passages of the upper core. In an alternate example, the temperature sensor may be encompassed by the coolant core by being disposed within the coolant core and being in direct contact with liquid coolant. The temperature sensor has the diameter F, described above, and a length M. In one specific example, the length M is 31.1 mm.

A conical tip end 818 of the temperature sensor is proximate to an upper wall of the exhaust runner 524. The conical tip end 818 is a distance N from the top wall of the exhaust runner 524. In one example, the distance N is 4.5 mm. The temperature sensor may provide a temperature measurement of the cylinder head at a location proximal to the exhaust face. As depicted in FIG. 1, the temperature sensor 296 sends a temperature signal to the controller 12. As stated above, the controller may use this temperature data to infer operating conditions and/or performance of the cooling system, such as loss of coolant, inoperable pump, and/or a system blockage. The controller may then send a signal to the driver giving early indication of the presence of a cooling system degradation if the temperature is greater than a threshold. Alternatively, or additionally, the controller may adjust engine operation, such as fuel injection amount or spark timing, to reduce exhaust gas temperature.

FIG. 8 shows a perspective view of the coolant core 700, including the upper core 720 and the lower core 710. The coolant core 700 may be formed by casting cores that are positioned as shown and placed together into an exterior mold during a casting process. Metal poured into the mold may then take the shape of the molds, hardening and forming cylinder head 253. The drill holes 702 and 704 may be drilled post-production of the cylinder head.

As shown, vertically aligned protrusions 920 included in both the upper and lower core may define the first set of crossover coolant passages 266. It will be appreciated that the crossover coolant passages may be vertically orientated relative to piston motion. The laterally aligned extensions 922 in both the upper and lower core may define the second set of crossover coolant passages 268. It will be appreciated that horizontally aligned extension 924 may define outlet 276 of the upper coolant jacket including restriction 277. FIG. 9 includes a more detailed view of the exhaust passage cluster 273, showing fluid coupling of the drill holes 702 and 704 to the lower coolant core 710 at an intersection region 706. Further, FIG. 9 shows fluid coupling of the openings 762 and 764 to the upper coolant core 720.

FIGS. 10-11 show alternate embodiments for a turbo neck coupled to exhaust port 320. As shown in FIG. 10, exhaust runners 522, 524, and 526 may be coupled to a mono scroll turbo neck. The mono turbo neck may be utilized for applications in which partial exhaust gas pulse separation is desired. It will be appreciated that the mono turbo neck may be inexpensive to manufacture when compared to more structurally complex turbo necks. Further, as shown in FIG. 11, exhaust runners 522, 524, and 526 may be coupled to a bifurcated mono scroll turbo neck 1200. The bifurcated mono turbo neck may be utilized for exhaust gas pulse separation in an engine including a twin scroll turbine. Furthermore, as shown in FIG. 12, exhaust runners 522, 524, and 526 may be coupled to a twin scroll turbo neck 1300. In the embodiment of FIG. 12, exhaust runner 424 is coupled to an upper scroll turbo neck 1302, while exhaust runners 522 and 526 are coupled to a lower scroll turbo neck 1304. Thus, the twin scroll provides increased exhaust gas pulse separation, enabling more design control of both high and low speed engine operating conditions. Therefore, the upper scroll turbo neck 1302 may be configured to flow exhaust gas to a first scroll in a turbine and the lower scroll turbo neck 1304 may be configured to flow exhaust gas to a second scroll in the turbine. It will be appreciated that the first and second scroll turbo necks may be fluidly separated. Further still, it will be appreciated that a different configuration for a turbo neck may be coupled to exhaust runners 522, 524, and 526 at the location of the exhaust port.

The above described cylinder head includes an integrated exhaust manifold. During operation of a vehicle including the example cylinder head, the cylinder head may experience higher temperatures due to the flow characteristics within the integrated exhaust manifold. The cylinder head cooling system is configured to flow coolant through passages of an upper cooling jacket and a lower cooling jacket sandwiching the cylinder head to provide cooling to the cylinder head walls and exhaust gases passing through the cylinder head. The IEM cylinder head includes a cluster of exhaust passages at an exhaust port. Each of the exhaust passages is defined by an exhaust runner coupled to an exhaust valve of a cylinder at an opposite end relative to the exhaust port. In an example engine including four cylinders, a first exhaust runner is coupled to a first cylinder, a second exhaust runner is coupled to a second and third cylinder, and a third runner is coupled to a fourth cylinder. Thus, each of the cylinders may be protected from high pressure exhaust blowdown pulses from other cylinders, and engine performance may be improved.

Further, the IEM cylinder head includes drill holes disposed between the material linking the cluster of exhaust passages. In the present example, a first drill hole extends between the exhaust runner coupled to the second and third cylinder and the exhaust runner coupled to the first cylinder, and a second drill hole extends between the exhaust runner coupled to the second and third cylinder and the exhaust runner coupled to the fourth cylinder. The drill holes intersect at a region that is within a lower coolant core of the lower cooling jacket, and are thus in fluid communication with the lower coolant core. An opposite end of each middle portion of the drill holes is in fluid communication with an upper coolant core. Openings of the drill holes are sealed with pipe plugs, such that liquid coolant may circulate through the lower coolant core, the drill holes, and the upper coolant core without losing liquid coolant through the drill holes. Circulation of liquid coolant through the drill holes provides additional cooling to walls of the exhaust runners and exhaust gases passing through the exhaust runners via heat exchange. Furthermore, the cylinder head may include a temperature sensor within a wall of the coolant jacket that is proximal to the exhaust port. In a condition where the temperature in the region near the exhaust port is greater than a threshold, a warning signal may be sent to an operator to stop operation of the vehicle. Thus, the above described features may decrease the likelihood of thermal degradation of the exhaust collector, the exhaust port, and the cylinder block, thereby increasing longevity of engine components. Moreover, downstream components, such as a turbocharger and/or an exhaust treatment system, may be protected from thermal degradation via cooling of exhaust gases, thereby increasing longevity of downstream components.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine cooling system, comprising:
 a cast cylinder head including an integrated exhaust manifold that directs exhaust gases to an exhaust outlet port, the integrated exhaust manifold contained within the cylinder head casting;
 a coolant passage surrounding the exhaust manifold and contained within the cylinder head casting, the coolant passage further having one or more coolant inlets and one or more coolant outlets;

a cluster of separated exhaust passages included in the integrated exhaust manifold for directing exhaust gases to the exhaust outlet port, the cluster including a drill hole disposed within material between the exhaust passages, the drill hole fluidically coupled to the coolant passage and spaced away from the inlets and outlets wherein the cluster of separated exhaust passages comprises three exhaust runners including a first exhaust runner coupled to a first cylinder, a second merged exhaust runner coupled to a second cylinder and a third cylinder, and a third exhaust runner coupled to a fourth cylinder, and where a firing order of the cylinders is the first cylinder, the third cylinder, the fourth cylinder, and the second cylinder in sequence; and a second drill hole disposed within material between the exhaust passages.

2. The engine cooling system of claim 1, wherein the second merged exhaust runner is disposed above the first exhaust runner and the third exhaust runner.

3. The engine cooling system of claim 2, wherein the first exhaust runner, the second merged exhaust runner, and the third exhaust runner are arranged symmetrically around a vertical centerline of the exhaust outlet port.

4. The engine cooling system of claim 3, wherein the drill hole is angled downward and is disposed between the first exhaust runner and the second merged exhaust runner, and the second drill hole is angled downward and is disposed between the second merged exhaust runner and the third exhaust runner.

5. The engine cooling system of claim 4, wherein the drill hole and the second drill hole intersect within the coolant passage at an angle of 100-150 degrees.

6. The engine cooling system of claim 1, wherein the coolant passage comprises an upper coolant core and a lower coolant core.

7. The engine cooling system of claim 6, wherein the drill hole comprises an opening and a middle portion, the opening at a top surface of the cylinder head and the middle portion disposed within the material between the exhaust passages of the exhaust passage cluster.

8. The engine cooling system of claim 7, wherein the middle portion is in fluid communication with the upper coolant core at a first end, and the middle portion is in fluid communication with the lower coolant core at a second end, the first end opposite of the second end.

9. The engine cooling system of claim 7, wherein the opening is sealed by a pipe plug disposed within the opening.

10. The engine cooling system of claim 6, further comprising a temperature sensor positioned in an upper wall of the coolant passage.

11. The engine cooling system of claim 10, wherein the temperature sensor is disposed in a vertical wall, the vertical wall extended into the upper coolant core and encompassed by the upper coolant core.

12. The engine cooling system of claim 11, wherein the temperature sensor is configured to send a temperature signal to a controller, the controller configured to send an over-temperature indication to a driver when the temperature is above a threshold.

13. An engine cylinder head comprising:
a cast cylinder head, including an integrated exhaust manifold contained within the cylinder head casting, that directs a plurality of cylinder exhaust gas outlet ports to an exhaust exit port, the exhaust exit port comprising a cluster of exhaust passages included in the integrated exhaust manifold;

an upper coolant jacket and a lower coolant jacket surrounding the exhaust manifold and having one or more coolant inlets and one or more coolant outlets; and a temperature sensor positioned above the exhaust exit port and encompassed by passages of the upper coolant jacket, wherein the cluster of exhaust passages comprises a first exhaust runner, a second exhaust runner, and a third exhaust runner, the second exhaust runner above the first exhaust runner and the third exhaust runner when a vehicle including the engine cylinder head is on a driving surface, the first exhaust runner, the second exhaust runner, and the third exhaust runner configured symmetrically relative to a vertical center line of the exhaust exit port.

14. The engine cylinder head of claim 13 further comprising a first drill hole disposed between the first exhaust runner and the second exhaust runner, and a second drill hole disposed between the second exhaust runner and the third exhaust runner.

15. The engine cylinder head of claim 14, wherein each of the first drill hole and the second drill hole comprises an opening and a middle portion, the middle portion disposed within a material between the exhaust runners in the cluster of exhaust passages, the opening sealed with a pipe plug.

16. The engine cylinder head of claim 15, wherein a first end of the middle portion is in fluid communication with an upper coolant core of the upper coolant jacket, and a second end of the middle portion is in fluid communication with a lower coolant core of the lower coolant jacket.

17. An engine system comprising:
a plurality of cylinders for combustion of fuel and air, the plurality of cylinders including a first cylinder, a second cylinder, a third cylinder, and a fourth cylinder; and
a cast cylinder head including an integrated exhaust manifold (IEM) that is contained within the cylinder head casting, the IEM coupled to the plurality of cylinders for directing exhaust gases to an exhaust outlet port, the cylinder head comprising:
a coolant passage surrounding the IEM having one or more coolant inlets and one or more coolant outlets and contained within the cylinder head, the coolant passage comprising an upper coolant core and a lower coolant core, a temperature sensor positioned in an upper wall of the coolant passage, the temperature sensor is disposed in a vertical wall, the vertical wall extended into the upper coolant core and encompassed by the upper coolant core, the temperature sensor configured to send a temperature signal to a controller, the controller configured to send an over-temperature indication to a driver when the temperature is above a threshold;
a cluster of exhaust passages included in the integrated exhaust manifold for directing exhaust gases to the exhaust port, the cluster of exhaust passages comprising a plurality of exhaust runners linked by a material between the three exhaust runners, the plurality of exhaust runners including a first exhaust runner coupled to the first cylinder, a second merged exhaust runner coupled to the second cylinder and the third cylinder, and a third exhaust runner coupled to the fourth cylinder, the second merged exhaust runner disposed above the first exhaust runner and the third exhaust runner, the first exhaust runner, the second merged exhaust runner, and the third exhaust runner arranged symmetrically around a vertical centerline of the exhaust outlet port, the exhaust outlet port further coupled to a turbo neck; and at least one drill hole disposed within a material between exhaust passages in the cluster of exhaust passages, the at least one drill hole fluidically coupled to the coolant passage, the at least one drill hole spaced away from the one or more coolant inlets and outlets, the at least one drill hole comprising a first drill hole and a second drill hole, the first drill hole angled downward and disposed between the first exhaust runner and the second exhaust runner, and the second drill hole angled downward and disposed between the second exhaust runner and the third exhaust runner, the first drill hole and the second drill hole each including an opening and a middle portion, the opening at a top surface of the cylinder head and the middle portion disposed within the material between the exhaust passages, the middle portion in fluid communication with the upper coolant core at a first end and in fluid communication with the lower coolant core at a second end, the first end opposite of the second end, the opening sealed by a pipe plug disposed within the opening.

* * * * *